(12) United States Patent
Yamamoto et al.

(10) Patent No.: US 9,254,757 B2
(45) Date of Patent: Feb. 9, 2016

(54) HYBRID VEHICLE AND PARAMETER DISPLAY METHOD FOR HYBRID VEHICLE

(75) Inventors: Masaya Yamamoto, Kasugai (JP); Yujin Gotoda, Kariya (JP); Koji Nomura, Toyota (JP); Takeshi Torii, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 443 days.

(21) Appl. No.: 13/147,149

(22) PCT Filed: Sep. 11, 2009

(86) PCT No.: PCT/JP2009/065923
§ 371 (c)(1),
(2), (4) Date: Aug. 23, 2011

(87) PCT Pub. No.: WO2011/030444
PCT Pub. Date: Mar. 17, 2011

(65) Prior Publication Data
US 2011/0295456 A1 Dec. 1, 2011

(51) Int. Cl.
*B60W 20/00* (2006.01)
*B60L 11/18* (2006.01)
(Continued)

(52) U.S. Cl.
CPC ............. *B60L 11/1864* (2013.01); *B60K 6/445* (2013.01); *B60L 11/123* (2013.01); *B60L 11/14* (2013.01);
(Continued)

(58) Field of Classification Search
CPC ... B60L 11/1864; B60L 11/123; B60L 11/14; B60L 2210/40; B60L 2250/16; B60W 50/14; B60W 2050/146; B60W 2710/0677; B60W 20/00; Y02T 10/7241; Y02T 10/6217; Y02T 10/7005; Y02T 10/6239; Y02T 10/70; B60K 2350/1092; B60K 6/445

USPC ......... 701/22, 99, 123, 29.1; 180/65.1–65.21, 180/65.275–65.29
See application file for complete search history.

(56) References Cited

U.S. PATENT DOCUMENTS 5,927,415 A * 7/1999 Ibaraki et al. .............. 180/65.25
7,898,405 B2 * 3/2011 Burke et al. ................. 340/461
(Continued)

FOREIGN PATENT DOCUMENTS

EP 2070787 A1 * 6/2009 ............. B60K 35/00
JP 57-166928 U 10/1982
(Continued)

OTHER PUBLICATIONS

International Search Report mailed Dec. 28, 2009 of PCT/JP2009/065923.

*Primary Examiner* — John Q Nguyen
*Assistant Examiner* — Alan D Hutchinson
(74) *Attorney, Agent, or Firm* — Kenyon & Kenyon LLP (57) ABSTRACT

On a display, a running power determined in accordance with an accelerator position or the like is displayed. When the hybrid vehicle is controlled in a CS mode, the running power is displayed together with eco-acceleration power greater than a first engine starting power. When the hybrid vehicle is controlled in a CD mode, the running power is displayed together with a second engine starting power in place of the eco-acceleration power. The engine is stopped when the running power is smaller than the first engine starting threshold value in the CS mode. The engine is driven when the running power is equal to or greater than the first engine starting threshold value in the CS mode. The engine is stopped when the running power is smaller than a second engine starting threshold value in the CD mode. The engine is driven when the running power is equal to or greater than the second engine starting threshold value in the CD mode. The second engine starting threshold value is greater than the first engine starting threshold value.

6 Claims, 9 Drawing Sheets

(51) Int. Cl.
   *B60K 6/445* (2007.10)
   *B60L 11/12* (2006.01)
   *B60L 11/14* (2006.01)
   *B60W 50/14* (2012.01)

(52) U.S. Cl.
   CPC ........ *B60W 50/14* (2013.01); *B60K 2350/1092* (2013.01); *B60L 2210/40* (2013.01); *B60L 2250/16* (2013.01); *B60W 20/00* (2013.01); *B60W 2050/146* (2013.01); *B60W 2710/0677* (2013.01); *Y02T 10/6217* (2013.01); *Y02T 10/6239* (2013.01); *Y02T 10/7005* (2013.01); *Y02T 10/7061* (2013.01); *Y02T 10/7077* (2013.01); *Y02T 10/7241* (2013.01)

(56) References Cited

U.S. PATENT DOCUMENTS

| | | | | |
|---|---|---|---|---|
| 8,058,982 B2 * | 11/2011 | Crowe et al. | | 340/455 |
| 8,200,388 B2 * | 6/2012 | Otake | | 701/32.5 |
| 8,207,841 B2 * | 6/2012 | Watson et al. | | 340/462 |
| 8,659,410 B2 * | 2/2014 | Saito | | 340/439 |
| 8,854,210 B2 * | 10/2014 | Matsuo et al. | | 340/541 |
| 8,922,358 B2 * | 12/2014 | Handa | | 340/438 |
| 2007/0151783 A1 * | 7/2007 | Yamauchi | | 180/65.3 |
| 2007/0208468 A1 * | 9/2007 | Sankaran et al. | | 701/29 |
| 2007/0298928 A1 * | 12/2007 | Yamanaka et al. | | 477/15 |
| 2009/0125173 A1 * | 5/2009 | Komatsu et al. | | 701/22 |
| 2009/0322503 A1 * | 12/2009 | Suzuki et al. | | 340/438 |
| 2011/0166732 A1 * | 7/2011 | Yu et al. | | 701/22 |
| 2011/0257823 A1 * | 10/2011 | Watanabe | | 701/22 |

FOREIGN PATENT DOCUMENTS

| | | |
|---|---|---|
| JP | 10-129298 A | 5/1998 |
| JP | 11-220808 A | 8/1999 |
| JP | 2005-255158 A | 9/2005 |
| JP | 2007-125921 A | 5/2007 |
| JP | 2008-074321 A | 4/2008 |
| JP | 2008-114791 A | 5/2008 |
| JP | 2009-018713 A | 1/2009 |
| JP | 2009-113706 A | 5/2009 |
| WO | WO 2009078363 A1 * | 6/2009 |

* cited by examiner

HYBRID VEHICLE AND PARAMETER DISPLAY METHOD FOR HYBRID VEHICLE

This is a 371 national phase application of PCT/JP2009/065923 filed 11 Sep. 2009, the contents of which are incorporated herein by reference.

TECHNICAL FIELD

The present invention relates to a hybrid vehicle and a parameter display method for a hybrid vehicle, and more particularly to a technique of switching parameter display manners between when a hybrid vehicle is controlled in a first mode and when a hybrid vehicle is controlled in a second mode.

BACKGROUND ART

Hybrid vehicles equipped with engines and motors as driving sources are conventionally known. A hybrid vehicle is equipped with a power storage device such as a battery for storing electric power to be supplied to a motor. The battery is charged with electric power generated by a power generator driven by an engine and electric power regenerated using the motor during deceleration of the vehicle.

Such a hybrid vehicle can run using either one or both of an engine and a motor as a driving source, depending on an operation state of the vehicle. Therefore, for example, when the vehicle speed is low, the engine is stopped and only the motor can be used as a driving source for running.

In a running state in which the engine is stopped and only the motor is used as a driving source, no exhaust gas is emitted and therefore the impact on the environment is small. Therefore, it is desired to indicate the current operation state relative to the operation region in which the engine can be stopped, so that the state in which the engine is stopped can be maintained as long as possible.

Japanese Patent Laying-Open No. 2008-74321 (Patent Document 1) discloses an indicator apparatus for a hybrid vehicle that incorporates an internal combustion engine and an electric motor as motive power sources, and that is capable of traveling in one of traveling modes including a first mode where traveling is performed while the internal combustion engine is stopped and a second mode where traveling is performed while both of the internal combustion engine and the electric motor are operated. The indicator apparatus includes: a control portion switching between the traveling modes based on an output demand from a driver; a first indicator portion indicating a first state amount that changes in accordance with the output demand from the driver; and a second indicator portion indicating, as corresponded to the first state amount, a second state amount that shows switching of the traveling modes.

Japanese Patent Laying-Open No. 2008-74321 further discloses that when starting of the internal combustion engine is demanded based on a prescribed condition, the traveling mode is forcibly switched to the second mode, and the second state amount is changed so as to show that the second mode is selected for an entire range of the first state amount.

Japanese Patent Laying-Open No. 2008-74321 further discloses that when a switch for selecting traveling in the first mode is operated by the driver, a threshold value for switching the traveling modes is changed so that a range in which traveling is performed in the first mode is increased, and the second state amount is changed in accordance with the change of the threshold value for switching. The 106-th paragraph of Japanese Patent Laying-Open No. 2008-74321 describes that the traveling mode is switched to HV mode (second mode) and threshold value TH (second state amount) is returned to a normal value when the state of charge becomes not greater than a prescribed value.

CITATION LIST

Patent Document

Patent Document 1: Japanese Patent Laying-Open No. 2008-74321

SUMMARY OF INVENTION

Technical Problem

In the indicator apparatus disclosed in Japanese Patent Laying-Open No. 2008-74321, the manner of displaying the state amount is switched as a result of starting of the engine. However, a hybrid vehicle is basically designed to repeat driving and stopping of the engine. Therefore, if the manner of displaying the traveling state is switched by driving of the engine, the display manner may be frequently switched. Thus, the driver's visibility may be impaired. On the other hand, if the manner of displaying the traveling state is fixed, it is difficult to provide the driver proper information in accordance with the operation state. In any case, the driver's convenience may be impaired.

The present invention is made to solve the aforementioned problem. An object of the present invention is to improve the driver's convenience concerning display of a parameter representing an operation state of a hybrid vehicle.

Solution to Problem

A hybrid vehicle is provided with an engine, an electric motor, and a power storage device that stores electric power to be supplied to the electric motor. The hybrid vehicle runs using at least one of driving forces including a driving force of the engine and a driving force of the electric motor. The hybrid vehicle includes: a control unit that determines a parameter of the hybrid vehicle in accordance with a driver's operation, controls the hybrid vehicle in accordance with the parameter in a first mode when a state of charge of the power storage device is equal to or smaller than a threshold value, and controls the hybrid vehicle in accordance with the parameter in a second mode when a state of charge of the power storage device is greater than the threshold value; and a display unit that displays the parameter. In the first mode, the control unit controls such that the engine is stopped when the parameter is smaller than a predetermined first value and such that the engine is driven when the parameter is equal to or greater than the first value. In the second mode, the control unit controls such that the engine is stopped when the parameter is smaller than a second value greater than the first value and such that the engine is driven when the parameter is equal to or greater than the second value. The display unit displays the parameter in different manners between when the hybrid vehicle is controlled in the first mode and when the hybrid vehicle is controlled in the second mode.

In this hybrid vehicle, the parameter determined in accordance with the driver's operation is displayed in different manners between when the hybrid vehicle is controlled in the first mode and when the hybrid vehicle is controlled in the second mode. The region in which the hybrid vehicle is controlled in the first mode includes a region in which the engine is stopped and a region in which the engine is driven. Similarly, the region in which the hybrid vehicle is controlled in the second mode includes a region in which the engine is stopped and a region in which the engine is driven. Therefore, the parameter display manner in the case where the engine is driven and the parameter display manner in the case where the engine is stopped can be made equal. Therefore, even when the engine repeats driving and stopping, the display manner can be the same. As a result, the driver's visibility can be improved. When the state of charge of the power storage device is equal to or smaller than the threshold value, the hybrid vehicle is controlled in the first mode. When the state of charge of the power storage device is greater than the threshold value, the hybrid vehicle is controlled in the second mode. The region in which the engine is stopped and the hybrid vehicle runs only with the driving force of the electric motor in the second mode is larger than the region in which the engine is stopped and the hybrid vehicle runs only with the driving force of the electric motor in the first mode. Therefore, the parameter determined in accordance with the driver's operation is displayed in different manners between when control is such that the engine is stopped and the hybrid vehicle mainly runs only with the driving force of the electric motor and when control is such that the hybrid vehicle runs efficiently using both of the engine and the electric motor. Accordingly, the driver can be provided with proper information in accordance with the operation state of the hybrid vehicle. As a result, the driver's convenience concerning display of the parameter representing the operation state of the hybrid vehicle can be improved.

Preferably, the display unit displays the parameter together with a third value greater than the first value when the hybrid vehicle is controlled in the first mode. The display unit displays the parameter together with the second value in place of the third value when the hybrid vehicle is controlled in the second mode.

Preferably, the display unit displays the parameter while displaying the third value using an indication at a predetermined location when the hybrid vehicle is controlled in the first mode. The display unit displays the parameter while displaying the second value in place of the third value using the indication when the hybrid vehicle is controlled in the second mode.

Preferably, the hybrid vehicle further includes a light portion which turns on when the engine is stopped in the second mode, and turns off when the engine is driven in the second mode.

Preferably, the parameter is power.

Advantageous Effects of Invention

The manner of displaying a parameter of a hybrid vehicle that is determined in accordance with an operation of the driver can be made equal between when the engine is driven and when the engine is stopped, and in addition, the parameter can be displayed in different manners in accordance with a control mode of the hybrid vehicle. Therefore, the driver's convenience concerning display of the parameter representing an operation state of the hybrid vehicle can be improved.

DESCRIPTION OF EMBODIMENTS

In the following, an embodiment of the present invention will be described with reference to the figures. In the following description, the same parts are denoted with the same reference numerals. Their designations and functions are also the same. Therefore, a detailed description thereof will not be repeated.

Figure 1:
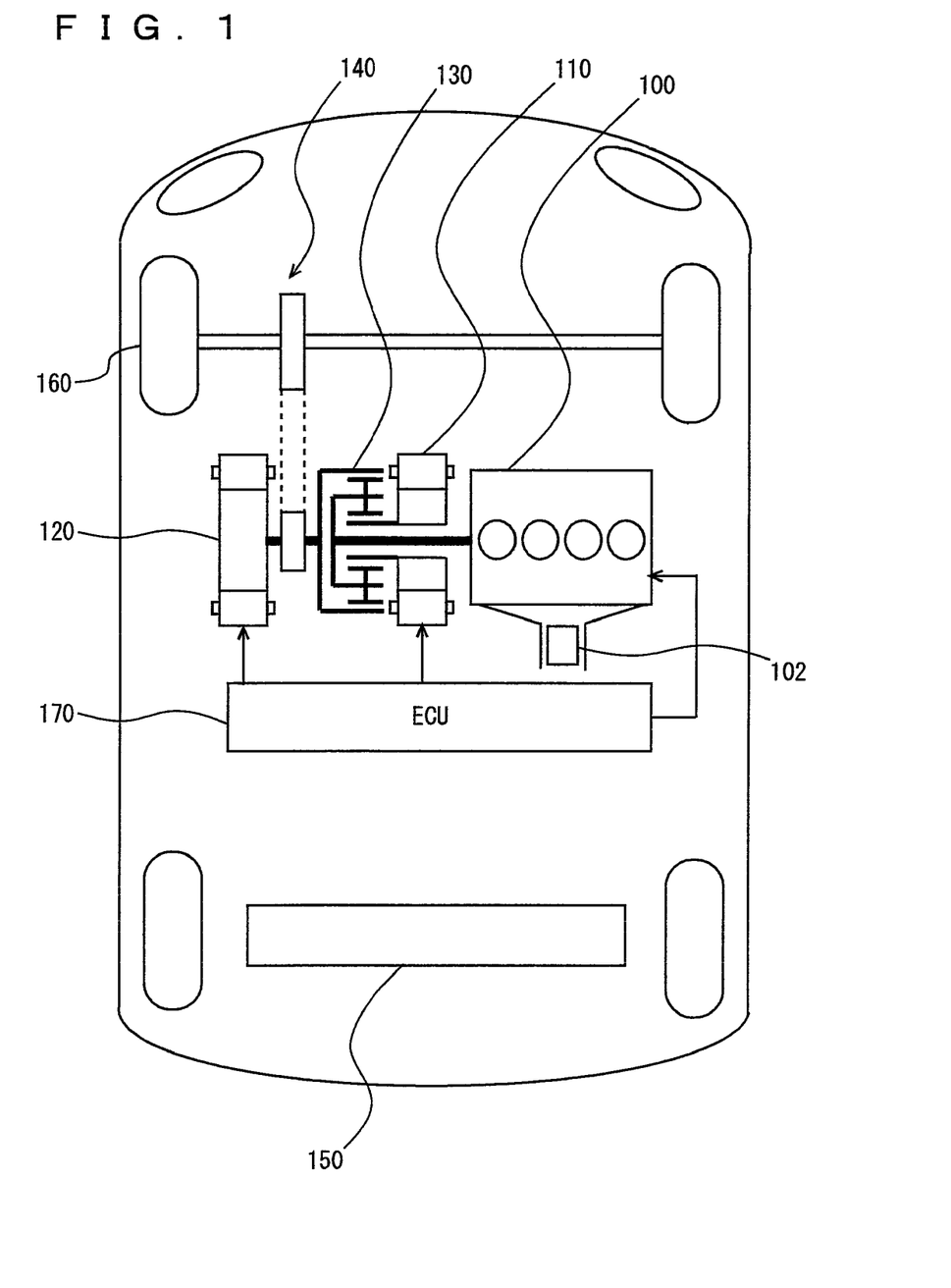
FIG. 1 is a schematic configuration diagram showing a plug-in hybrid vehicle.

Referring to FIG. 1, a plug-in hybrid vehicle is equipped with an engine 100, a first MG (Motor Generator) 110, a second MG 120, a power split mechanism 130, a speed reducer 140, and a battery 150. Although a plug-in hybrid vehicle is described by way of example in the following description, a hybrid vehicle that does not have a charge function from an external power source may be used in place of a plug-in hybrid vehicle.

Engine 100, first MG 110, second MG 120, and battery 150 are controlled by an ECU (Electronic Control Unit) 170. ECU 170 may be divided into a plurality of ECUs.

This vehicle runs using a drive force from at least one of engine 100 and second MG 120. More specifically, either one or both of engine 100 and second MG 120 are automatically selected as a driving source depending on an operation state.

For example, when the accelerator position is small and when the vehicle speed is low, the plug-in hybrid vehicle runs on only second MG 120 as a driving source. In this case, engine 100 is stopped. However, engine 100 is sometimes driven, for example, for power generation.

On the other hand, when the accelerator position is large, when the vehicle speed is high, or when the SOC (State of Charge) of battery 150 is small, engine 100 is driven. In this case, the plug-in hybrid vehicle runs on only engine 100 or both of engine 100 and second MG 120 as a driving source.

This vehicle runs while, for example, automatically switching between a CS (Charge Sustaining) mode and a CD (Charge Depleting) mode. It is noted that the CS mode and the CD mode may be manually switched.

In the CS mode, the plug-in hybrid vehicle runs while maintaining electric power stored in battery 150 at a prescribed target value.

In the CD mode, the plug-in hybrid vehicle runs using electric power, mainly using the driving force of second MG 120, without maintaining electric power stored in battery 150 for running. However, in the CD mode, for example, when the accelerator position is large and when the vehicle speed is high, engine 100 may be driven to supplement the driving source.

The CS mode may also be referred to as an HV mode. Similarly, the CD mode may also be referred to as an EV mode. It is noted that the HV mode (CS mode) and the EV mode (CD mode) in the subject application differ from the HV mode and the EV mode described in Japanese Patent Laying-Open No. 2008-74321. The CS mode and the CD mode will be described in more detail later.

Engine 100 is an internal combustion engine. An air-fuel mixture is burned in a combustion chamber to rotate a crank shaft serving as an output shaft. Exhaust gas emitted from engine 100 is cleaned by a catalyst 102 and thereafter emitted to the outside of the vehicle. Catalyst 102 performs a cleaning function when warmed up to a specific temperature. Catalyst 102 is warmed up by heat of the exhaust gas. Catalyst 102 is, for example, a three-way catalyst.

Engine 100, first MG 110, and second MG 120 are connected via power split mechanism 130. Motive power generated by engine 100 is split into two paths by power split mechanism 130. One of the paths is a path for driving front wheels 160 through speed reducer 140. The other is a path for driving first MG 110 for power generation.

First MG 110 is a three-phase alternating current electric rotating machine including a U-phase coil, a V-phase coil, and a W-phase coil. First MG 110 generates electric power using motive power of engine 100 that is split by power split mechanism 130. The electric power generated by first MG 110 is used depending on the running state of the vehicle or the state of charge of battery 150. For example, in the normal running, electric power generated by first MG 110 is directly used as electric power for driving second MG 120. On the other hand, when SOC of battery 150 is lower than a predetermined value, electric power generated by first MG 110 is converted from alternating current into direct current by an inverter described later. Thereafter, the voltage is adjusted by a converter described later and then stored in battery 150.

When first MG 110 acts as a power generator, first MG 110 generates negative torque. Here, negative torque refers to such torque that becomes a load on engine 100. When first motor MG 110 receives power supply and acts as a motor, first MG 110 generates positive torque. Here, positive torque refers to such torque that does not become a load on engine 100, that is, such torque that assists in rotation of engine 100. This is applicable to second MG 120.

Second MG 120 is a three-phase alternating current electric rotating machine including a U-phase coil, a V-phase coil, and a W-phase coil. Second MG 120 is driven by at least one of electric power stored in battery 150 and electric power generated by first MG 110.

The driving force of second MG 120 is transmitted to front wheels 160 through speed reducer 140. Accordingly, second MG 120 assists engine 100 or allows the vehicle to run with the driving force from second MG 120. The rear wheels may be driven in place of or in addition to front wheels 160.

At the time of regenerative braking of the plug-in hybrid vehicle, second MG 120 is driven by front wheels 160 through speed reducer 140, so that second MG 120 operates as a power generator. Thus, second MG 120 operates as a regenerative brake which converts braking energy into electric power. The electric power generated by second MG 120 is stored in battery 150.

Power split mechanism 130 is formed of a planetary gear train including a sun gear, pinion gears, a carrier, and a ring gear. The pinion gears are engaged with the sun gear and the ring gear. The carrier supports the pinion gears such that they are rotatable on their own axes. The sun gear is coupled to the rotation shaft of first MG 110. The carrier is coupled to the crank shaft of engine 100. The ring gear is coupled to the rotation shaft of second MG 120 and speed reducer 140.

Engine 100, first MG 110, and second MG 120 are coupled via power split mechanism 130 formed of the planetary gear train, so that the rotational speeds of engine 100, first MG 110, and second MG 120 have the relation represented by a straight line in an alignment chart.

Battery 150 is a battery pack configured such that a plurality of battery modules, each formed by integrating a plurality of battery cells, are connected in series. The voltage of battery 150 is, for example, about 200 V. Battery 150 is charged with electric power supplied from first MG 110 and second MG 120 as well as a power source external to the vehicle. A capacitor may be used in place of or in addition to battery 150.

Figure 2:
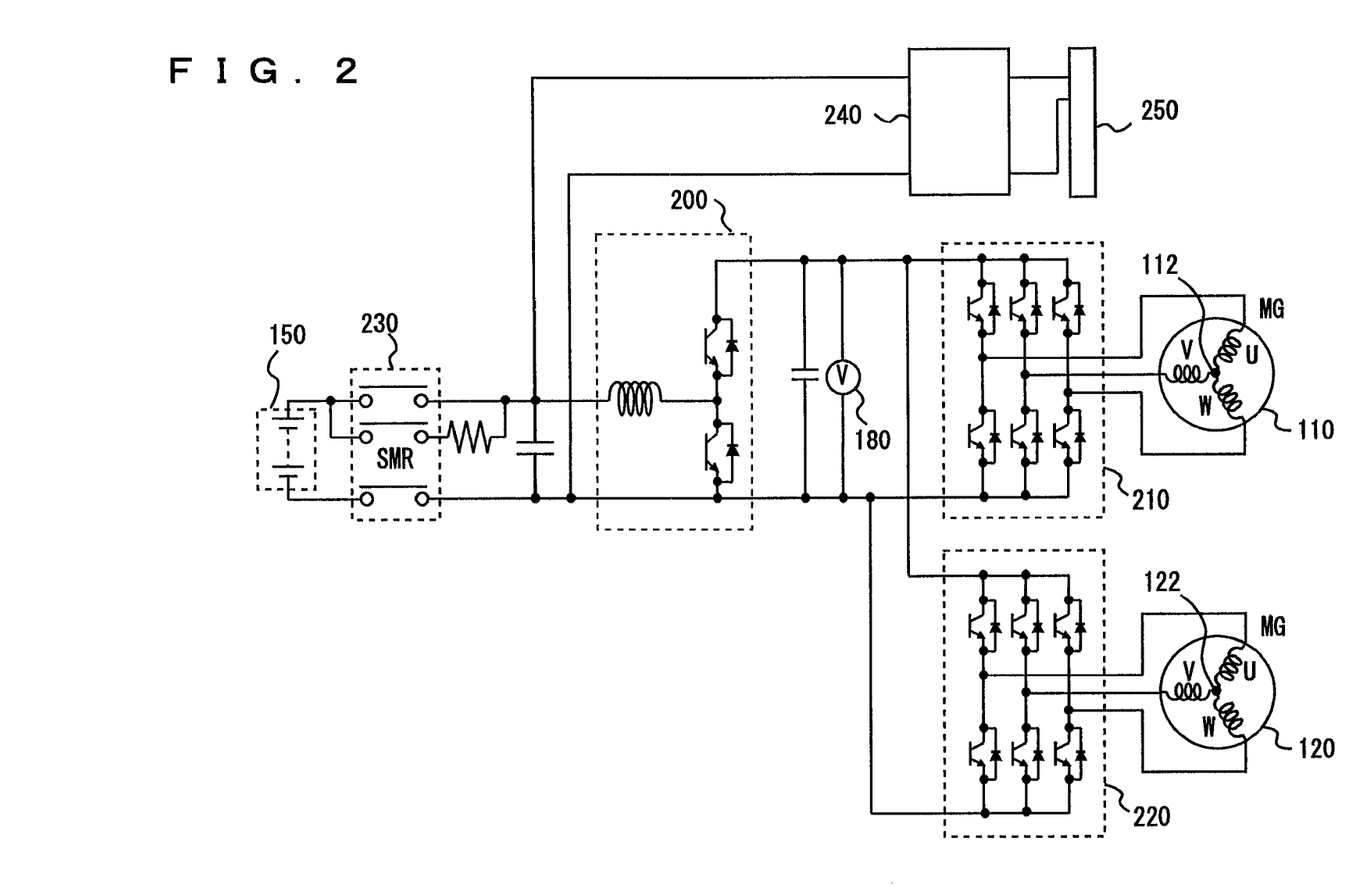
FIG. 2 is a first diagram showing an electrical system of the plug-in hybrid vehicle.

Referring to FIG. 2, an electrical system of the plug-in hybrid vehicle will be further described. Provided in the plug-in hybrid vehicle are a converter 200, a first inverter 210, a second inverter 220, an SMR (System Main Relay) 230, a charger 240, and an inlet 250.

Converter 200 includes a reactor, two npn transistors, and two diodes. The reactor has one end connected to the positive electrode side of each battery and has the other end connected to a node between the two npn transistors.

The two npn transistors are connected in series. The npn transistors are controlled by ECU 170. A diode is connected between the collector and the emitter of each npn transistor to allow current to flow from the emitter side to the collector side.

As the npn transistor, for example, an IGBT (Insulated Gate Bipolar Transistor) can be used. In place of the npn transistor, a power switching element such as a power MOSFET (Metal Oxide Semiconductor Field-Effect Transistor) can be used.

When electric power discharged from battery 150 is supplied to first MG 110 or second MG 120, the voltage is boosted by converter 200. Conversely, when electric power generated by first MG 110 or second MG 120 is supplied to battery 150, the voltage is decreased by converter 200.

A system voltage VH between converter 200 and each inverter is detected by a voltage sensor 180. The detection result from voltage sensor 180 is sent to ECU 170.

First inverter 210 includes a U-phase arm, a V-phase arm, and a W-phase arm. The U-phase arm, the V-phase arm, and the W-phase arm are connected in parallel. The U-phase arm, the V-phase arm, and the W-phase arm each have two npn transistors connected in series. A diode is connected between the collector and the emitter of each npn transistor to allow current to flow from the emitter side to the collector side. Then, the node between the npn transistors in each arm is connected to the end different from a neutral point 112 of each coil of first MG 110.

First inverter 210 converts direct current supplied from battery 150 into alternating current and supplies the alternating current to first MG 110. First inverter 210 converts alternating current generated by first MG 110 into direct current.

Second inverter 220 includes a U-phase arm, a V-phase arm, and a W-phase arm. The U-phase arm, the V-phase arm, and the W-phase arm are connected in parallel. The U-phase arm, the V-phase arm, and the W-phase arm each have two npn transistors connected in series. A diode is connected between the collector and the emitter of each npn transistor to allow current to flow from the emitter side to the collector side. Then, the node between the npn transistors in each arm is connected to the end different from a neutral point 122 of each coil of second MG 120.

Second inverter 220 converts direct current supplied from battery 150 into alternating current and supplies the alternating current to second MG 120. Second inverter 220 converts alternating current generated by second MG 120 into direct current.

Converter 200, first inverter 210, and second inverter 220 are controlled by ECU 170.

SMR 230 is provided between battery 150 and charger 240. SMR 230 is a relay for switching between a state in which battery 150 and the electrical system are connected and a state in which they are cut off. When SMR 230 is in an open state, battery 150 is cut off from the electrical system. When SMR 230 is in a closed state, battery 150 is connected to the electrical system.

More specifically, when SMR 230 is in an open state, battery 150 is electrically cut off from converter 200, charger 240, and the like. When SMR 230 is in a closed state, battery 150 is electrically connected to converter 200, charger 240, and the like.

The state of SMR 230 is controlled by ECU 170. For example, when ECU 170 is activated, SMR 230 is closed. When ECU 170 is stopped, SMR 230 is opened.

Figure 3:
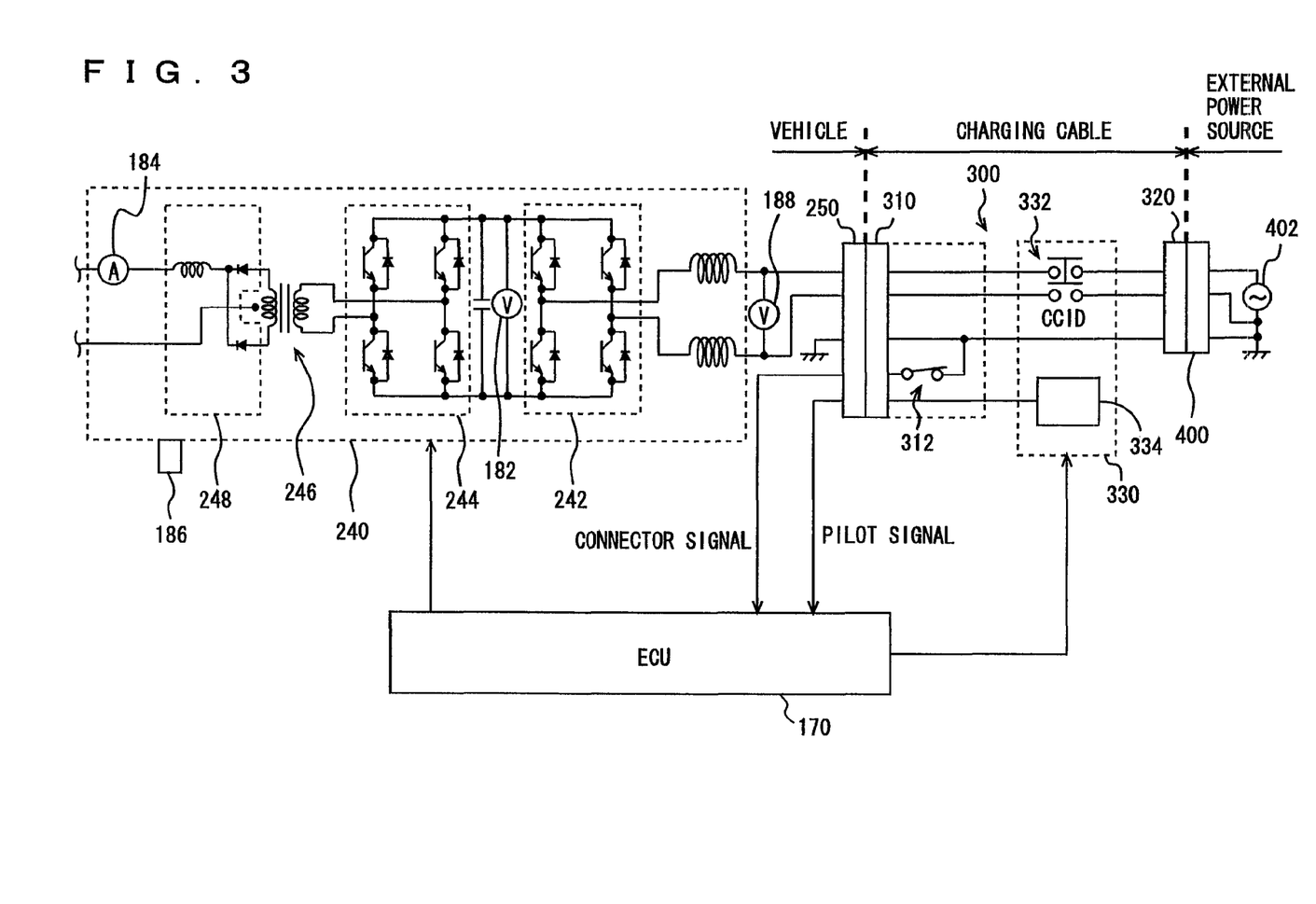
FIG. 3 is a second diagram showing an electrical system of the plug-in hybrid vehicle.

Charger 240 is connected between battery 150 and converter 200. As shown in FIG. 3, charger 240 includes an AC/DC converter circuit 242, a DC/AC converter circuit 244, an isolation transformer 246, and a rectifier circuit 248.

AC/DC converter circuit 242 is formed of a single-phase bridge circuit. AC/DC converter circuit 242 convers AC (alternating current) power into DC (direct current) power based on a drive signal from ECU 170. AC/DC converter 242 also functions as a boost chopper circuit which boosts voltage by using a coil as a reactor.

DC/AC converter circuit 244 is formed of a single-phase bridge circuit. DC/AC converter circuit 244 converts DC power into high-frequency AC power based on a drive signal from ECU 170 and outputs the AC power to isolation transformer 246.

Isolation transformer 246 includes a core made of a magnetic material, and a primary coil and a secondary coil wound around the core. The primary coil and the secondary coil are electrically isolated from each other and connected to DC/AC converter circuit 244 and rectifier circuit 248, respectively. Isolation transformer 246 transforms the high-frequency AC power received from DC/AC converter circuit 244 into a voltage level corresponding to a turns ratio between the primary coil and the secondary coil, and outputs the transformed AC power to rectifier circuit 248. Rectifier circuit 248 rectifies the AC power output from isolation transformer 246 into DC power.

Voltage between AC/DC converter circuit 242 and DC/AC converter circuit 244 (terminal-to-terminal voltage of a smoothing capacitor) is detected by a voltage sensor 182, and a signal representing the detection result is input to ECU 170. Output current of charger 240 is detected by a current sensor 184, and a signal representing the detection result is input to ECU 170. Furthermore, the temperature of charger 240 is detected by a temperature sensor 186, and a signal representing the detection result is input to ECU 170.

When battery 150 is charged from a power source external to the vehicle, ECU 170 generates a drive signal for driving charger 240 and outputs the generated drive signal to charger 240.

ECU 170 has a failure detection function for charger 240 in addition to the control function for charger 240. When the voltage detected by voltage sensor 182, the current detected by current sensor 184, the temperature detected by temperature sensor 186, or the like is equal to or greater than a threshold value, the failure of charger 240 is detected.

Inlet 250 is provided, for example, on a side of the plug-in hybrid vehicle. Inlet 250 is connected with a connector 310 of a charging cable 300 for coupling the plug-in hybrid vehicle to an external power source 402.

Charging cable 300 for coupling the plug-in hybrid vehicle to external power source 402 includes connector 310, a plug 320, and a CCID (Charging Circuit Interrupt Device) 330.

Connector 310 of charging cable 300 is connected to inlet 250 provided on the plug-in hybrid vehicle. Connector 310 is provided with a switch 312. When switch 312 is closed while connector 310 of charging cable 300 is being connected to inlet 250 provided on the plug-in hybrid vehicle, a connector signal CNCT is input to ECU 170 to indicate that connector 310 of charging cable 300 is being connected to inlet 250 provided on the plug-in hybrid vehicle.

Switch 312 opens/closes in connection with a latch for latching connector 310 of charging cable 300 with inlet 250 of the plug-in hybrid vehicle. The latch is swung by the operator pressing a button provided on connector 310.

Figure 4:
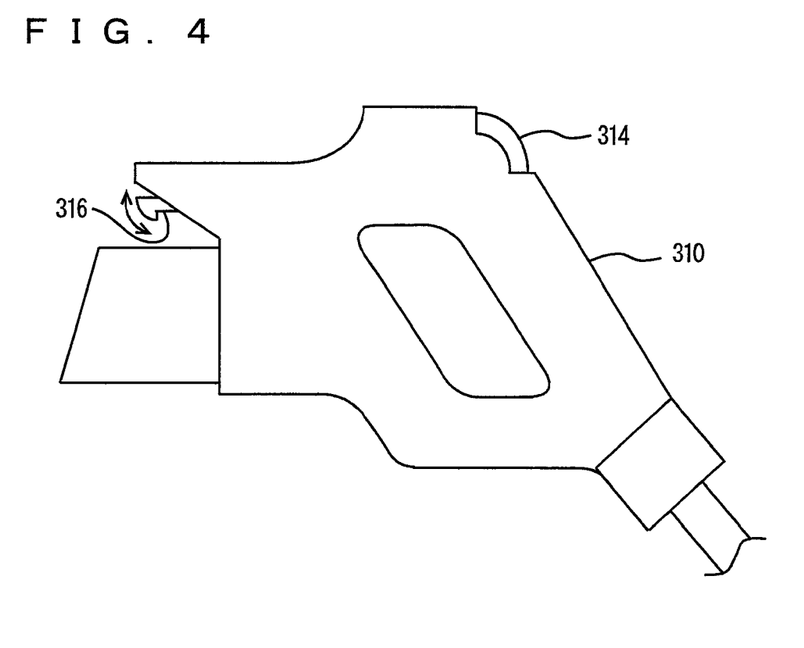
FIG. 4 is an illustration showing a connector of a charging cable.

For example, when the operator releases the finger from a button 314 of connector 310 shown in FIG. 4 while connector 310 of charging cable 300 is being connected to inlet 250 provided on the plug-in hybrid vehicle, a latch 316 engages with inlet 250 provided on the plug-in hybrid vehicle, and switch 312 closes. When the operator presses button 314, latch 316 is disengaged from inlet 250, and switch 312 opens. It is noted that the way to open/close switch 312 is not limited thereto.

Returning to FIG. 3, plug 320 of charging cable 300 is connected to a receptacle 400 provided at the house. Receptacle 400 is supplied with AC power from power source 402 external to the plug-in hybrid vehicle.

CCID 330 has a relay 332 and a control pilot circuit 334. When relay 332 is in an open state, a path for supplying electric power from power source 402 external to the plug-in hybrid vehicle to the plug-in hybrid vehicle is cut off. When relay 332 is in a closed state, electric power can be supplied from power source 402 external to the plug-in hybrid vehicle to the plug-in hybrid vehicle. The state of relay 332 is controlled by ECU 170 while connector 310 of charging cable 300 is being connected to inlet 250 of the plug-in hybrid vehicle.

Control pilot circuit 334 sends a pilot signal (square wave signal) CPLT to a control pilot line in a state in which plug 320 of charging cable 300 is connected to receptacle 400, that is, external power source 402, and connector 310 is connected to inlet 250 provided on the plug-in hybrid vehicle. The pilot signal is produced from an oscillator provided inside control pilot circuit 334.

Control pilot circuit 334 may output constant pilot signal CPLT when plug 320 of charging cable 300 is connected to receptacle 400, even when connector 310 is detached from inlet 250 provided on the plug-in hybrid vehicle. However, ECU 170 cannot detect pilot signal CPLT output in a state in which connector 310 is detached from inlet 250 provided on the plug-in hybrid vehicle.

When plug 320 of charging cable 300 is connected to receptacle 400 and connector 310 is connected to inlet 250 of the plug-in hybrid vehicle, control pilot circuit 334 produces pilot signal CPLT having a predetermined pulse width (duty cycle).

With the pulse width of pilot signal CPLT, the plug-in hybrid vehicle is notified of the possible current-carrying capacity. For example, the plug-in hybrid vehicle is notified of the current-carrying capacity of charging cable 300. The pulse width of pilot signal CPLT is constant independent from voltage and current of external power source 402.

On the other hand, if the kind of charging cable to be used is different, the pulse width of pilot signal CPLT may be different. In other words, the pulse width of pilot signal CPLT may be set for each kind of charging cable.

In the present embodiment, battery 150 is charged with electric power supplied from external power source 402 in a state in which the plug-in hybrid vehicle and external power source 402 are coupled to each other by charging cable 300. During charging of battery 150, SMR 230 and relay 332 in CCID 330 are closed.

AC voltage VAC of external power source 402 is detected by a voltage sensor 188 provided inside the plug-in hybrid vehicle. The detected voltage VAC is sent to ECU 170.

Figure 5:
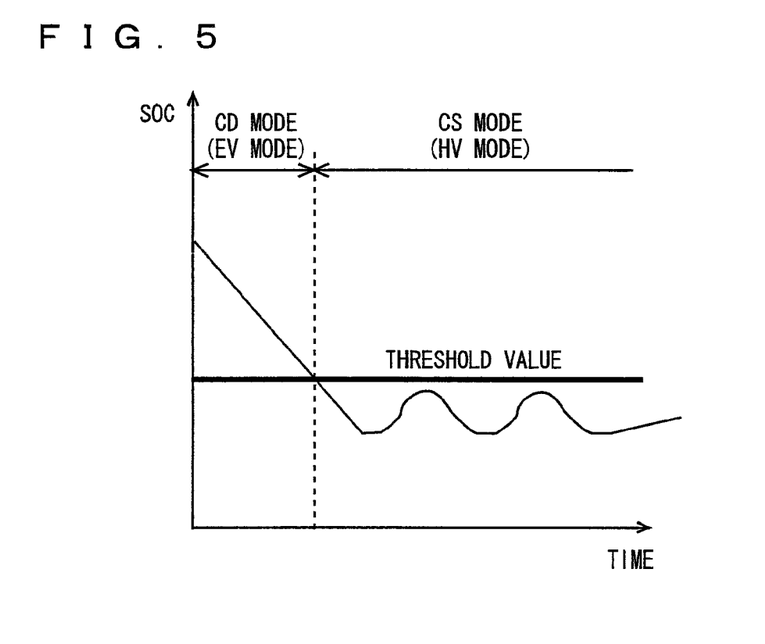
FIG. 5 is a diagram showing a region in which a CS mode is selected and a region in which a CD mode is selected.

Referring to FIG. 5, the CS mode and the CD mode will be further described. ECU 170 determines which mode of the CS mode and the CD mode is to be selected. For example, if SOC of battery 150 is equal to or smaller than a threshold value, the CS mode is selected. If SOC of battery 150 is greater than the threshold value, the CD mode is selected.

More specifically, the CS mode is selected when SOC of battery 150 is equal to or smaller than the threshold value, or when the electrical system of the plug-in hybrid vehicle is stopped last time in a state in which the CS mode is selected.

The CD mode is selected when SOC of battery 150 is greater than the threshold value and there exists a history of charging battery 150 by power source 402 external to the plug-in hybrid vehicle, or when SOC of battery 150 is greater than the threshold value and the electrical system of the plug-in hybrid vehicle is stopped last time in a state in which the CD mode is selected. Since charging of battery 150 is controlled by ECU 170, whether there exists a history of charging battery 150 by power source 402 external to the plug-in hybrid vehicle is determined inside ECU 170 using, for example, a flag. It is noted that the way to select the CS mode and the CD mode is not limited thereto.

In the CS mode and the CD mode, the plug-in hybrid vehicle runs using the driving force from at least one of engine 100 and second MG 120.

Figure 6:
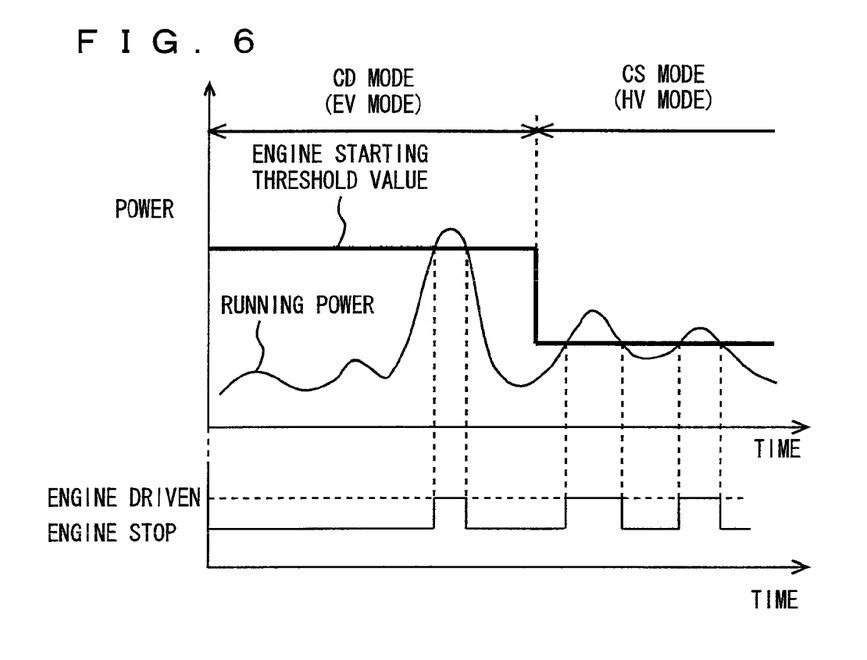
FIG. 6 is a diagram showing a period during which an engine is driven.

As shown in FIG. 6, when the running power of the plug-in hybrid vehicle is smaller than an engine starting threshold value, the plug-in hybrid vehicle runs only using the driving force of second MG 120.

On the other hand, when the running power of the plug-in hybrid vehicle becomes the engine starting threshold value or greater, engine 100 is driven. Thus, the plug-in hybrid vehicle runs using the driving force of engine 100 in addition to or in place of the driving force of second MG 120. Electric power generated by first MG 110 using the driving force of engine 100 is directly supplied to second MG 120.

As is clear from FIG. 6, the region in which the plug-in hybrid vehicle is controlled in the CS mode includes a region in which engine 100 is stopped and a region in which engine 100 is driven. Similarly, the region in which the plug-in hybrid vehicle is controlled in the CD mode includes a region in which engine 100 is stopped and a region in which engine 100 is driven.

The running power is calculated by ECU 170, for example, in accordance with a map having the opening degree of the accelerator pedal operated by the driver (accelerator position), the vehicle speed, and the like as parameters. It is noted that the way to calculate the running power is not limited thereto.

In the present embodiment, the running power is used as a parameter of the plug-in hybrid vehicle that is determined in accordance with the driver's operation. It is noted that torque, acceleration, driving force, accelerator position, or the like may be used as a parameter of the plug-in hybrid vehicle.

The engine starting threshold value in the CD mode is greater than the engine starting threshold value in the CS mode. More specifically, the region in which engine 100 stops and the plug-in hybrid vehicle runs only with the driving force of second MG 120 in the CD mode is larger than the region in which engine 100 stops and the plug-in hybrid vehicle runs only with the driving force of second MG 120 in the CS mode. Therefore, in the CD mode, control is such that engine 100 is stopped and the plug-in hybrid vehicle mainly runs only with the driving force of second MG 120. On the other hand, the frequency of engine 100 being driven in the CS mode is higher than the frequency of engine 100 being driven in the CD mode. Therefore, in the CS mode, control is such that the plug-in hybrid vehicle runs efficiently using both of engine 100 and second MG 120.

In the following, the engine starting threshold value in the CS mode is also referred to as a first engine starting power. The engine starting threshold value in the CD mode is also referred to as a second engine starting power.

The electric power charged in battery 150 in the CD mode is set smaller than the electric power charged in battery 150 in the CS mode. Specifically, in the CS mode, charging power to battery 150 is set in accordance with SOC of battery 150. Engine 100 is driven such that electric power corresponding to the set charging power can be generated using first MG 110. On the other hand, in the CD mode, the charging power to battery 150 is usually set to zero. In other words, in the CD mode, battery 150 is charged with electric power obtained by regenerative braking, but engine 100 is not driven for the purpose of charging battery 150.

Therefore, in the CD mode, electric power stored in battery 150, in particular, electric power supplied from power source 402 external to the plug-in hybrid vehicle is actively consumed.

Figure 7:
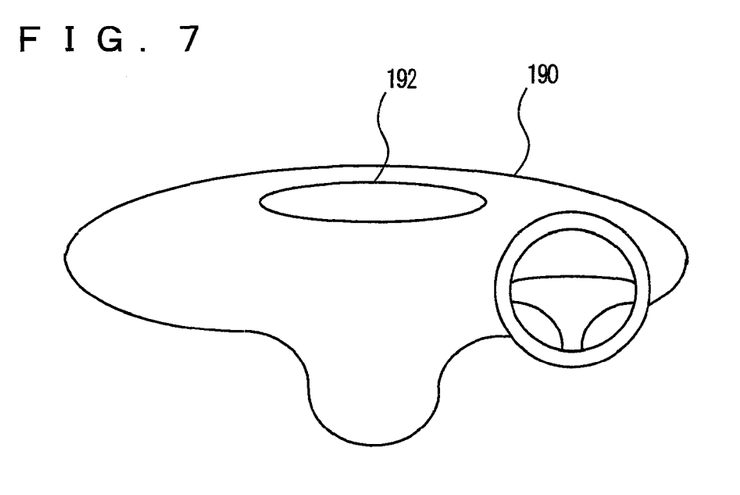
FIG. 7 is an illustration showing an instrument panel.

Referring to FIG. 7, an instrument panel 190 provided on the front side of the interior of the plug-in hybrid vehicle will be described.

Figure 8:
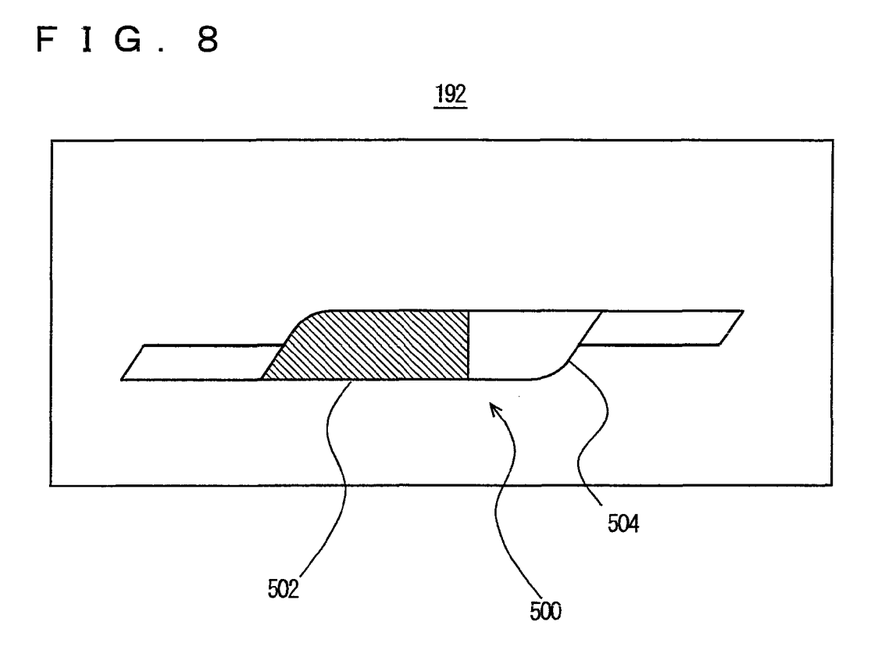
FIG. 8 is an illustration showing a system indicator appearing on a display.

On instrument panel 190, a display 192 is provided. As shown in FIG. 8, a system indicator 500 is displayed on display 192. A hatched portion 502 of system indicator 500 shows the parameter of the plug-in hybrid vehicle that is determined in accordance with the driver's operation. In the present embodiment, hatched portion 502 of system indicator 500 shows the running power of the plug-in hybrid vehicle. It is noted that torque, acceleration, driving force, accelerator position, and the like may be displayed in place of the running power. The form of the system indicator is not limited to that illustrated below, and the running power may be displayed in various forms. For example, the running power may be displayed using a well-known display form, for example, such as an icon, a graph, a histogram, and a numeral.

On display 192, the running power is displayed in different manners between the CS mode and the CD mode.

When the plug-in hybrid vehicle is controlled in the CS mode, the running power is displayed together with a third threshold value predetermined so as to be greater than the first engine starting power (the engine starting threshold value in the CS mode).

The running power is displayed together with the third threshold value indicated by an end portion 504 of system indicator 500 displayed at a predetermined location. In other words, in the CS mode, end portion 504 of system indicator 500 shows the third threshold value.

Figure 9:
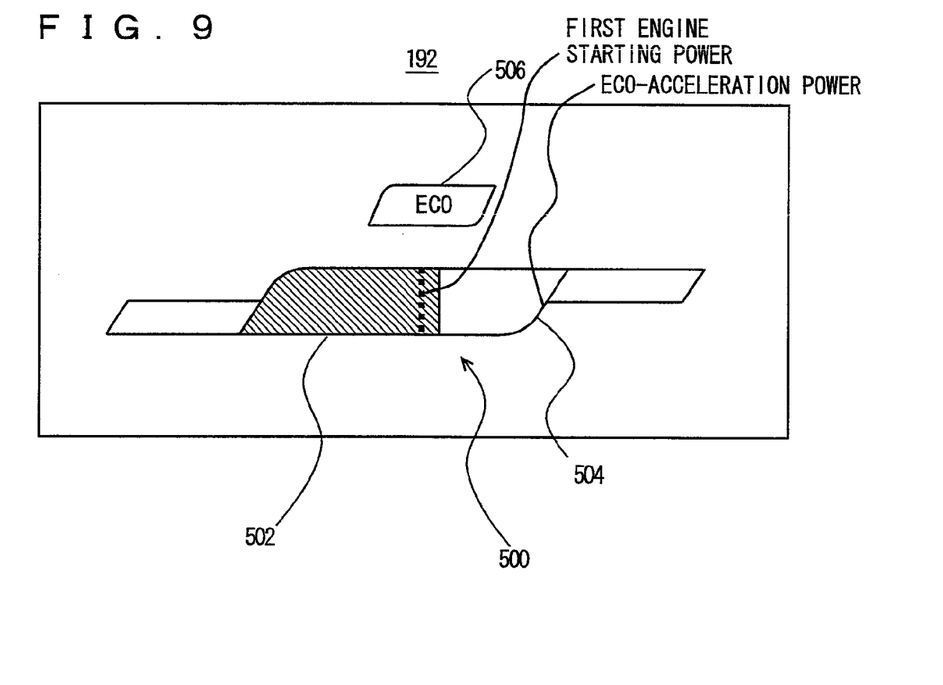
FIG. 9 is an illustration showing the system indicator appearing on the display in the CS mode.

As shown in FIG. 9, for example, an eco-acceleration power predetermined by the developer based on the results of experiments and simulations is displayed as the third threshold value together with the running power. In other words, the ratio between the eco-acceleration power and the running power is indicated by system indicator 500. The eco-acceleration power shows, for example, the maximum value in a range in which the vehicle can run with good fuel economy. It is noted that the definition of the eco-acceleration power is not limited thereto. The maximum value of power that can be output by the plug-in hybrid vehicle may be displayed as the third threshold value together with the running power. Any other value may be displayed as the third threshold value together with the running power.

As shown in FIG. 9, when the running power is smaller than the eco-acceleration power, an eco-lamp 506 turns on to indicate that the running power is smaller than the eco-acceleration power. When the running power is equal to or greater than the eco-acceleration power, eco-lamp 506 turns off.

Figure 10:
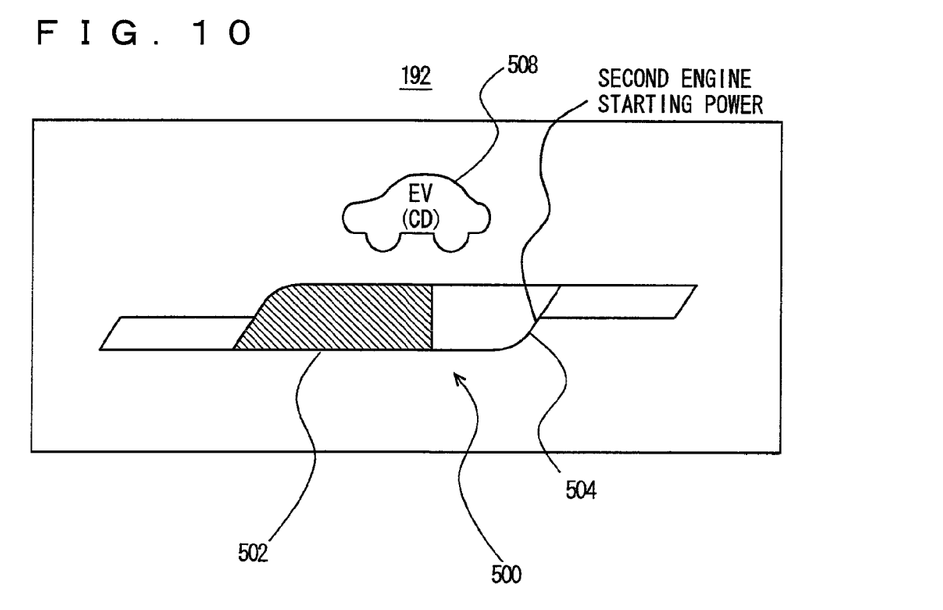
FIG. 10 is an illustration showing the system indicator appearing on the display in the CD mode.

As shown in FIG. 10, when the plug-in hybrid vehicle is controlled in the CD mode, the running power is displayed together with the second engine starting power (the engine starting threshold value in the CD mode) in place of the eco-acceleration power (third threshold value).

The running power is displayed together with the second engine starting power indicated by end portion 504 of system indicator 500, in place of the eco-acceleration power. In other words, in the CS mode, end portion 504 of system indicator 500 shows the second engine starting power. Therefore, the ratio between the second engine starting power and the running power is indicated by system indicator 500.

As shown in FIG. 10, when the running power is smaller than the second engine starting power, an EV lamp 508 turns on to indicate that the running power is smaller than the second engine starting power. When the running power is equal to or greater than the second engine starting power, EV lamp 508 turns off. In other words, EV lamp 508 turns on when engine 100 stops in the CD mode. EV lamp 508 turns off when engine 100 is driven in the CD mode.

Figure 11:
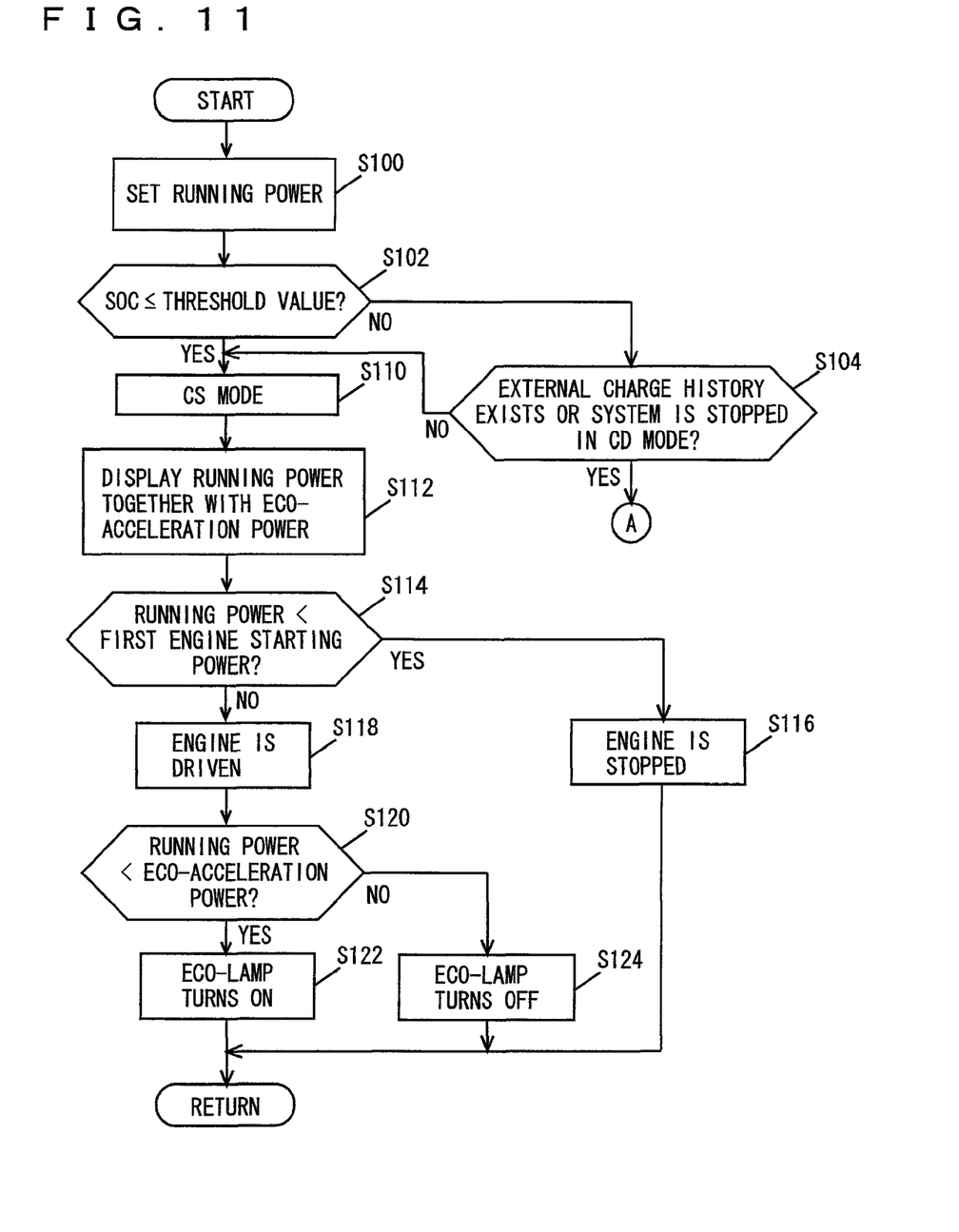
FIG. 11 is a first diagram showing a flowchart showing a control structure of the hybrid vehicle.
Figure 12:
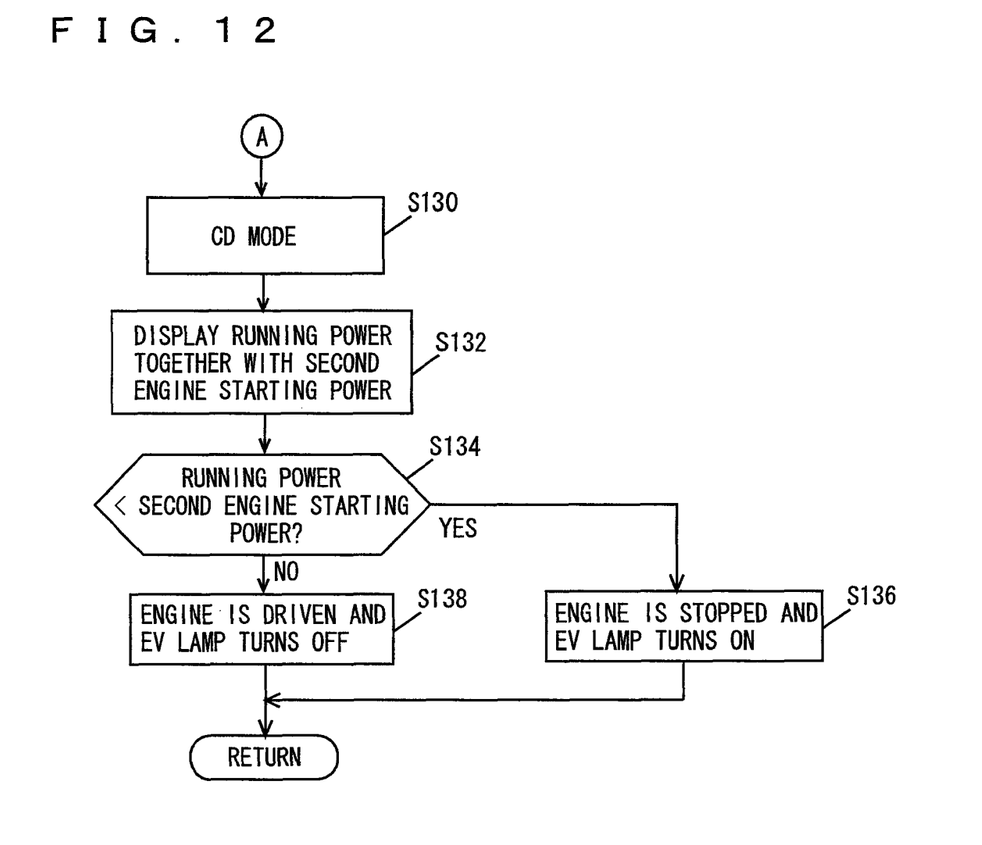
FIG. 12 is a second diagram showing a flowchart showing a control structure of the hybrid vehicle.

Referring to FIGS. 11 and 12, a control structure of the plug-in hybrid vehicle will be described.

In step (step is hereinafter abbreviated as S) 100, ECU 170 sets the running power of the plug-in hybrid vehicle based on the accelerator position, the vehicle speed, and the like.

In S102, ECU 170 determines whether SOC of battery 150 is equal to or smaller than the threshold value.

If SOC of battery 150 is equal to or smaller than the threshold value (YES in S102), the process proceeds to S110. If not (NO in S102), the process proceeds to S104.

In S104, ECU 170 determines whether there exists a history of charging battery 150 by power source 402 external to the plug-in hybrid vehicle or whether the electrical system of the plug-in hybrid vehicle is stopped last time in a state in which the CD mode is selected.

If there exists a history of charging battery 150 by power source 402 external to the plug-in hybrid vehicle or if the electrical system of the plug-in hybrid vehicle is stopped last time in a state in which the CD mode is selected (YES in S104), the process proceeds to S130. If not (NO in S104), the process proceeds to S110.

In S110, ECU 170 controls the plug-in hybrid vehicle in accordance with the running power in the CS mode.

In S112, display 192 displays the running power together with the eco-acceleration power.

In S114, ECU 170 determines whether the running power of the plug-in hybrid vehicle is smaller than the first engine starting power. If the running power is smaller than the first engine starting power (YES in S114), the process proceeds to S116. If not (NO in S114), the process proceeds to S118.

In S116, engine 100 is stopped. In S118, engine 100 is driven.

In S120, ECU 170 determines whether the running power is smaller than the eco-acceleration power. If the running power of the plug-in hybrid vehicle is smaller than the eco-acceleration power (YES in S120), the process proceeds to S122. If not (NO in S120), the process proceeds to S124.

In S122, eco-lamp 506 turns on. In S124, eco-lamp 506 turns off.

In S130, ECU 170 controls the plug-in hybrid vehicle in accordance with the running power in the CD mode.

In S132, display 192 displays the running power together with the second engine starting power in place of the eco-acceleration power.

In S134, ECU 170 determines whether the running power of the plug-in hybrid vehicle is smaller than the second engine starting power. If the running power is smaller than the second engine starting power (YES in S134), the process proceeds to S136. If not (NO in S134), the process proceeds to S138.

In S136, engine 100 is stopped, and EV lamp 508 turns on. In S138, engine 100 is driven, and EV lamp 508 turns off.

As described above, in the plug-in hybrid vehicle in the present embodiment, the running power determined in accordance with the driver's operation is displayed in different manners between when the plug-in hybrid vehicle is controlled in the CS mode and when the plug-in hybrid vehicle is controlled in the CD mode. The region in which the plug-in hybrid vehicle is controlled in the CS mode includes a region in which engine 100 is stopped and a region in which engine 100 is driven. Similarly, the region in which the plug-in hybrid vehicle is controlled in the CD mode includes a region in which engine 100 is stopped and a region in which engine 100 is driven. Therefore, the running power display manner in the case where engine 100 is driven and the running power display manner in the case where engine 100 is stopped can be made equal. Accordingly, even when engine 100 repeats driving and stopping, the display manner can be the same. As a result, the driver's visibility can be improved. When SOC of battery 150 is equal to or smaller than the threshold value, the plug-in hybrid vehicle is controlled in the CS mode. When SOC of battery 150 is greater than the threshold value, the plug-in hybrid vehicle is controlled in the CD mode. The region in which engine 100 is stopped and the plug-in hybrid vehicle runs only with the driving force of second MG 120 in the CD mode is larger than the region in which engine 100 is stopped and the plug-in hybrid vehicle runs only with the driving force of second MG 120 in the CS mode. Therefore, the running power determined in accordance with the driver's operation is displayed in different manners between when control is such that engine 100 is stopped and the plug-in hybrid vehicle mainly runs only with the driving force of second MG 120 and when control is such that the plug-in hybrid vehicle runs efficiently using both of engine 100 and second MG 120. Accordingly, the driver can be provided with proper information in accordance with the operation state of the plug-in hybrid vehicle. As a result, the driver's convenience concerning display of the running power representing the operation state of the plug-in hybrid vehicle can be improved.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 100 engine, 102 catalyst, 110 first MG, 120 second MG, 130 power split mechanism, 140 speed reducer, 150 battery, 160 front wheels, 170 ECU, 190 instrument panel, 192 display, 200 converter, 210 first inverter, 220 second inverter, 230 SMR, 240 charger, 242 AC/DC converter circuit, 244 DC/AC converter circuit, 246 isolation transformer, 248 rectifier circuit, 250 inlet, 300 charging cable, 310 connector, 312 switch, 314 button, 316 latch, 320 plug, 332 relay, 334 control pilot circuit, 400 receptacle, 402 power source, 500 system indicator, 502 hatched portion, 504 end portion, 506 eco-lamp, 508 EV lamp.

The invention claimed is:

1. A hybrid vehicle, comprising:
   an engine,
   an electric motor, and
   a power storage device that stores electric power to be supplied to said electric motor
   a control unit that determines a parameter of said hybrid vehicle in accordance with a driver's operation and switches a control mode between a Charge Depleting mode that does not sustain SOC of said power storage device and a Charge Sustain mode that sustains the SOC; and
   a display unit that displays said parameter, wherein
   in said Charge Sustain mode, said control unit drives said engine when said parameter is equal to or greater than a first value,
   in said Charge Depleting mode, said control unit when said parameter is equal to or greater than a second value that is greater than said first value, and
   said display unit displays said parameter in different manners between when said hybrid vehicle is controlled in said Charge Sustain mode and when said hybrid vehicle is controlled in said Charge Depleting mode.

2. The hybrid vehicle according to claim 1, wherein said display unit displays said parameter while displaying a third value greater than said first value using an indication at a predetermined location when said hybrid vehicle is controlled in said Charge Sustain mode, and said display unit displays said parameter while displaying said second value in place of said third value using said indication when said hybrid vehicle is controlled in said Charge Depleting mode.

3. The hybrid vehicle according to claim 1, further comprising a light portion which turns on when said engine is stopped in said Charge Depleting mode, and which turns off when said engine is driven in said Charge Depleting mode.

4. The hybrid vehicle according to claim 1, wherein said parameter is power.

5. A parameter display method for a hybrid vehicle which is provided with an engine, an electric motor, and a power storage device that stores electric power to be supplied to said electric motor, comprising the steps of:
   determining a parameter of said hybrid vehicle in accordance with a driver's operation, and switching a control mode between a Charge Depleting mode that does not sustain SOC of said power storage device and a Charge Sustain mode that sustains the SOC; and
   displaying said parameter, said step of controlling said hybrid vehicle including the steps of:
   in said Charge Sustain mode, driving said engine when said parameter is equal to or greater than said first value; and
   in said Charge Depleting mode, driving said engine when said parameter is equal to or greater than a second value that is greater than said first value,
   said step of displaying said parameter including a step of displaying said parameter in different manners between when said hybrid vehicle is controlled in said Charge Sustain mode and when said hybrid vehicle is controlled in said Charge Depleting mode.

6. The hybrid vehicle according to claim 1, wherein said display unit displays said parameter together with a third value greater than said first value when said hybrid vehicle is controlled in said Charge Sustain mode, and displays said parameter together with said second value in place of said third value when said hybrid vehicle is controlled in said Charge Depleting mode.

* * * * *